(12) United States Patent
Huang

(10) Patent No.: US 7,565,832 B2
(45) Date of Patent: Jul. 28, 2009

(54) TIRE PRESSURE MONITOR

(76) Inventor: Teng-Wen Huang, No. 4, Lane 30, Wu Chuan St., Panchiao City, Taipei Hsien (TW)

( * ) Notice: Subject to any disclaimer, the term of this patent is extended or adjusted under 35 U.S.C. 154(b) by 518 days.

(21) Appl. No.: 11/328,913

(22) Filed: Jan. 9, 2006

(65) Prior Publication Data
US 2007/0044552 A1    Mar. 1, 2007

(30) Foreign Application Priority Data
Aug. 31, 2005   (TW) .............................. 94129955 A

(51) Int. Cl.
*B60C 23/02* (2006.01)
(52) U.S. Cl. .................. 73/146.8; 73/146; 340/442
(58) Field of Classification Search ........ 73/146–146.8; 340/442–447
See application file for complete search history.

(56) References Cited

U.S. PATENT DOCUMENTS

| | | | | |
|---|---|---|---|---|
| 4,425,558 A | * | 1/1984 | McConchie | 340/446 |
| 4,814,745 A | * | 3/1989 | Wang | 340/442 |
| 5,040,561 A | * | 8/1991 | Achterholt | 137/227 |
| 5,581,023 A | * | 12/1996 | Handfield et al. | 73/146.5 |
| 5,604,481 A | * | 2/1997 | Lin | 340/442 |
| 5,731,516 A | * | 3/1998 | Handfield et al. | 73/146.5 |
| 5,837,891 A | * | 11/1998 | Bridge | 73/146.8 |
| 6,006,600 A | * | 12/1999 | Cheng | 73/146.5 |
| 6,034,596 A | * | 3/2000 | Smith et al. | 340/447 |
| 6,856,245 B2 | * | 2/2005 | Smith et al. | 340/442 |
| 7,251,993 B1 | * | 8/2007 | Okubo et al. | 73/146.4 |
| 7,317,381 B2 | * | 1/2008 | Miyazaki | 340/426.33 |
| 7,320,247 B2 | * | 1/2008 | Katou | 73/146 |
| 7,421,891 B2 | * | 9/2008 | Katou | 73/146.8 |

FOREIGN PATENT DOCUMENTS

TW         M261387         9/2000

* cited by examiner

*Primary Examiner*—Edward Lefkowitz
*Assistant Examiner*—Jermaine Jenkins
(74) *Attorney, Agent, or Firm*—Pai Patent & Trademark Law Firm; Chao-Chang David Pai

(57) ABSTRACT

A tire pressure detector includes an electrically conductive housing having a housing body and a protruding annular body; a cover having a sleeve portion connected to the protruding annular body, an airtight chamber defined by the cover and the housing for receiving a battery device, a PCB and a first electrically conductive resilient member, the housing body or the cover being disposed with an air intake mouth; and the PCB having a pressure and temperature detecting device. The air intake mouth guides air inside the tire to flow into the airtight chamber. The pressure and temperature detecting device detects the pressure and temperature of the air inside the tire and transmits data to the microprocessor for processing. The microprocessor controls the transmitter to transmit a signal. A receiver disposed near a driver's seat receives and processes the signal and then displays the tire pressure and temperature value on a display.

18 Claims, 8 Drawing Sheets

TIRE PRESSURE MONITOR

RELATED APPLICATIONS

The present application is based on, and claims priority from, Taiwan Application Serial Number 94129955, filed Aug. 31, 2005, the disclosure of which is hereby incorporated by reference herein in its entirety.

FIELD OF THE INVENTION

The present invention relates to a tire pressure detector, and particularly to a tire pressure detector which is readily assembled, can avoid short circuiting, and measures in a high precision.

BACKGROUND OF THE INVENTION

Regardless of the kinds of vehicles, tires of the vehicles must be inflated to a proper pressure. When tire pressure is too low or tire temperature is too high, driving safety is adversely affected. In addition, due to high rotational speeds when driving and imperfect airtightness of the tire valve stem, air inside the tire gradually leaks out, which causes the tire pressure to be too low and thus decreases driving safety. Therefore, many tire pressure indication devices have been developed for displaying tire pressure so a user can know when the tire pressure is abnormal.

Taiwan Utility Model Patent No. M261387 discloses a tire pressure alarm device which includes a metal casing enclosing a lateral separating seat and a protruding shoulder formed near the top thereof; a valve nozzle disposed at the bottom of the metal casing; a membrane disposed at the top surface of the lateral separating seat; a sleeve received in an upper chamber and locating on the membrane with a through-hole defined in the top portion thereof; a pushing rod received in the sleeve with the bottom portion thereof abutting against the membrane, and with the top portion thereof extending through the through-hole of the sleeve, and a laterally protruding ring formed near the bottom thereof; a resilient member disposed between the protruding ring of the pushing rod and the top of the sleeve and covering the pushing rod; a metal contact board disposed at the top portion of the pushing rod and disposed astride the protruding shoulder of the metal casing, wherein when the tire pressure is normal, the metal contact board is upwardly pushed by the tire pressure and departs from the protruding shoulder, and when the tire pressure is insufficient, the metal contact board moves downwardly and contacts the protruding shoulder; a battery device disposed at the top surface of the contact board and contacting the metal contact board with a negative pole thereof; a conductive member connected with a positive pole of the battery device; a transmission device disposed at the top portion of the conductive member and of the metal casing; and a cover disposed at the periphery of the metal casing. The tire pressure alarm device employs the resilience of the resilient member to confront the tire pressure, that is, the resilience of the resilient member is employed as the desired value of the tire pressure. When the tire pressure is insufficient, the tire pressure fails in confronting the resilience of the resilient member, and so fails in upwardly pushing the resilient member and the pushing rod and the metal contact board on the resilient member. Thus, the metal contact board keeps contact with the protruding shoulder of the metal casing and so switches on the power supply circuit of the battery device. Therefore, the transmission device transmits a signal which is received by a receiver disposed near the driver's seat for alarming the driver.

The tire pressure alarm device employs the resilience of the resilient member as a desired value of the tire pressure and controls switching on or off of the circuit through pushing a related mechanical module (the membrane, the pushing rod and the metal contact board) being pushed or not. The mechanical module can only detect at a lower pressure point. Furthermore, the tire pressure alarm device transmits an alarm signal from the transmission device only when the tire pressure is insufficient. However, the tire pressure alarm device cannot display the tire pressure status in real time in operation. When the transmission device of the tire pressure alarm device does not transmit an alarm signal, it does not mean that the tire pressure is normal because it is possible that the battery has no power or the mechanical module is damaged. Therefore, the tire pressure and temperature value cannot be provided in real time, which results in inconvenience of determining the status of the tire and adversely affects the safety of driving.

SUMMARY OF THE INVENTION

To overcome the above shortcomings, an object of the present invention is to provide a tire pressure detector which is readily assembled, measures in high precision, and displays tire pressure in real time.

To achieve the above object, a tire pressure detector according to the present invention includes an electrically conductive housing having a housing body and a protruding annular body, the protruding annular body having an outer wall with thread, the housing body having a loading portion formed therein and an air intake mouth, the air intake mouth having a lateral separating seat therein, the lateral separating seat being defined with a central hole, a valve nozzle device being disposed at the central hole, the air intake mouth being for assembling to a tire valve stem; a cover having a sleeve portion, the sleeve portion having an inner thread in the inner wall thereof for threadedly engaging with the outer thread of the protruding annular body, an internal space surrounded by the cover and the electrically conductive housing forming an airtight chamber for receiving a battery device, a PCB (printed circuit board) and a first electrically conductive resilient member; the battery device disposed at the top surface of the loading portion of the electrically conductive housing; the PCB disposed at the top surface of the protruding annular body of the electrically conductive housing, the PCB having an electronic pressure and temperature detecting device which includes a pressure and temperature sensor, a microprocessor and a transmitter; and the first electrically conductive resilient member disposed between the PCB and the battery device. The positive and negative poles of the battery device respectively connect the positive and negative poles of the PCB through the first electrically conductive resilient member and the electrically conductive housing. The air intake mouth guides air inside the tire to flow into the airtight chamber. The pressure and temperature sensor detects the pressure and temperature of the air inside the tire and transmits data to the microprocessor for processing. The microprocessor controls the transmitter to transmit a signal. A receiver disposed near a driver's seat receives and processes the signal and then displays the tire pressure and temperature value on a display.

To achieve the above object, a tire pressure detector according to the present invention includes an electrically conductive housing having a housing body and a protruding annular body, the protruding annular body having an outer wall with thread, the housing body having a loading portion formed therein; a cover having a sleeve portion, the sleeve portion having an inner thread in the inner wall thereof for threadedly engaging with the outer thread of the protruding annular body, an internal space enveloped by the cover and the electrically conductive housing forming an airtight chamber for receiving a battery device, a PCB and a first electrically conductive resilient member, the cover having an air intake mouth, the air intake mouth having a through hole in communication with the airtight chamber, the air intake mouth being connected with a tire valve stem through a guiding air tube; the battery device disposed at the top surface of the loading portion of the electrically conductive housing; the PCB being disposed at the top surface of the protruding annular body of the electrically conductive housing, the PCB having an electronic pressure and temperature detecting device which includes a pressure and temperature sensor, a microprocessor and a transmitter; and the first electrically conductive resilient member being disposed between the PCB and the battery device. The positive and negative poles of the battery device respectively connect the positive and negative poles of the PCB through the first electrically conductive resilient member and the electrically conductive housing. The air intake mouth guides air inside the tire to flow into the airtight chamber. The pressure and temperature sensor detects the pressure and temperature of the air inside the tire and transmits data to the microprocessor for processing. The microprocessor controls the transmitter to transmit out a signal. A receiver disposed near a driver's seat receives and processes the signal and then displays the tire pressure and temperature values on a display.

Furthermore, the cover is provided with an air inflation nozzle which has a channel in communication with the airtight chamber. The channel has a check valve assembly. When the tire pressure is insufficient, the tire can be inflated through the air inflation nozzle without having to detach the tire pressure detector.

These and other embodiments, aspects and features of the invention will be better understood from a detailed description of the preferred embodiments of the invention, which are further described below in conjunction with the accompanying figures.

DETAILED DESCRIPTION OF THE PREFERRED EMBODIMENT

Figure 1:
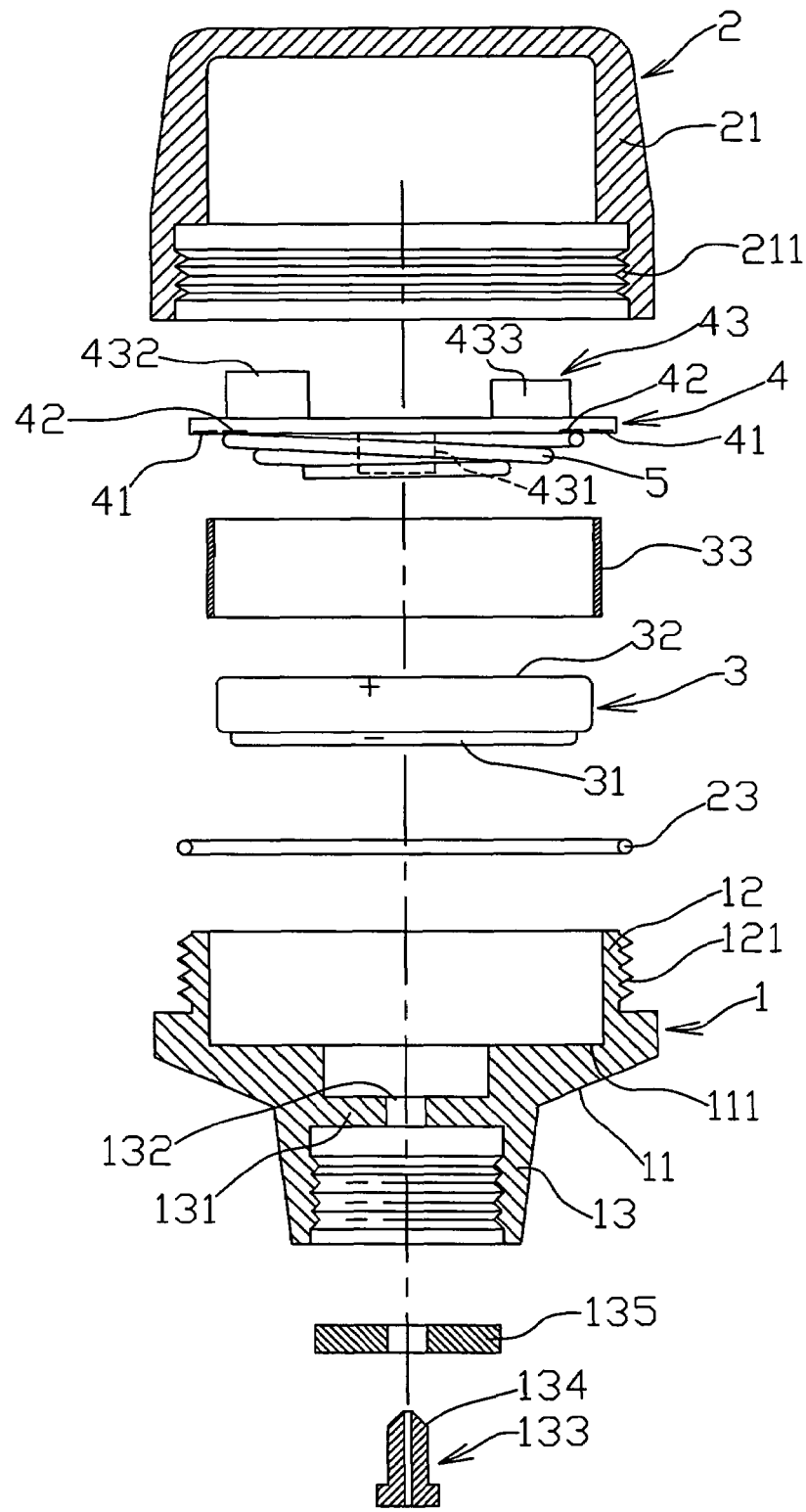
FIG. 1 is an exploded view of a tire pressure detector in accordance with a first embodiment of the present invention.
Figure 2:
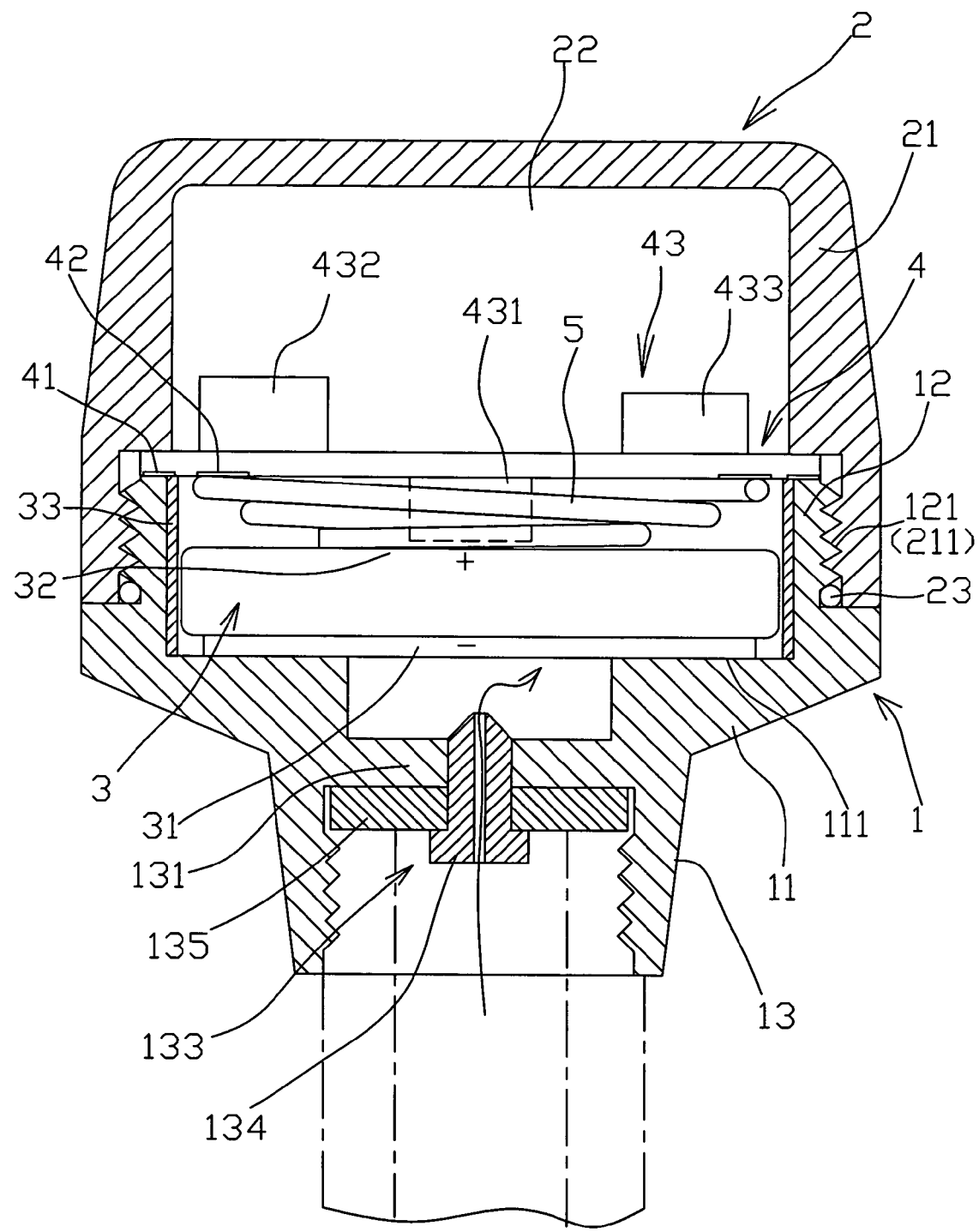
FIG. 2 is a cross-sectional view of an assembled tire pressure detector of FIG. 1.
Figure 3:
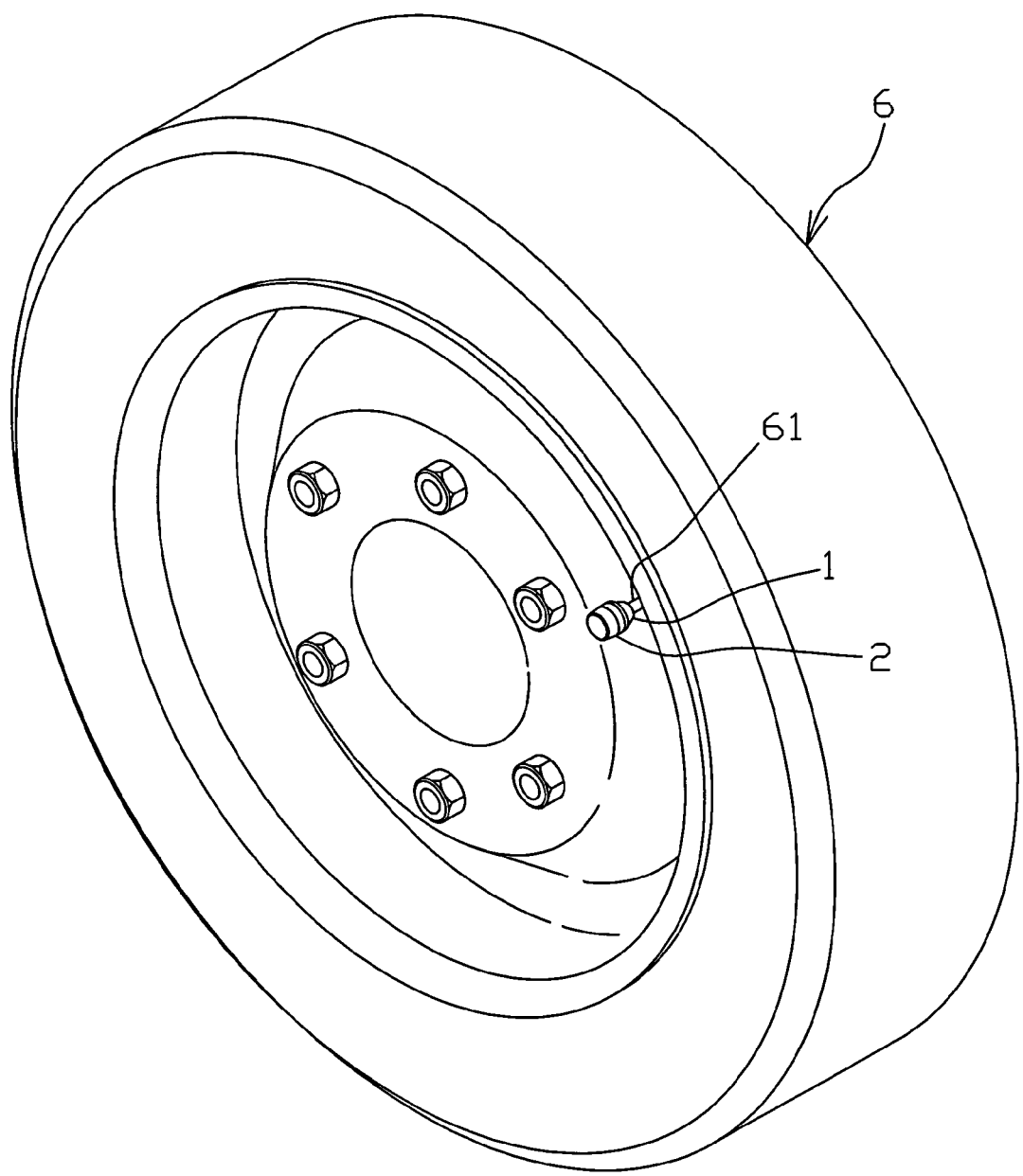
FIG. 3 is a schematic view showing the tire pressure detector of FIG. 2 being disposed at a tire valve stem.

The present invention is described with reference to the attached drawings. FIG. 1 is an exploded view of a tire pressure detector in accordance with a first embodiment of the present invention, FIG. 2 is a cross-sectional view of an assembled tire pressure detector of FIG. 1, and FIG. 3 is a schematic view showing the tire pressure detector of FIG. 2 being disposed at a tire valve stem.

As shown in the drawings, the tire pressure detector of the present invention includes an electrically conductive housing 1, a cover 2, a battery device 3, a printed circuit board (PCB) 4 and a first electrically conductive resilient member 5.

The electrically conductive housing 1 has a housing body 11 and a protruding annular body 12. The protruding annular body 12 has an outer thread 121 at the outer surface thereof. A loading portion 111 is formed inside the housing body 11. The housing body 11 has an air intake mouth 13 with a laterally separating seat 131 being formed therein. A central hole 132 is defined in the laterally separating seat 131 for receiving a valve nozzle device 133. The valve nozzle device 133 includes a valve nozzle 134 and a resilient gasket 135 covering the periphery of the valve nozzle 134. The top portion of the valve nozzle 134 extends through the central hole 132 of the laterally separating seat 131. The air intake mouth 13 is assembled to a tire valve stem 61 of a tire 6 (as shown in FIG. 3) and opens the tire valve stem 61 with the valve nozzle 134 whereby air in the tire flows into the inner space of the electrically conductive housing 1.

The cover 2 has a sleeve portion 21 with an inner thread 211 being defined in the inner wall thereof. The inner thread 211 of the cover 2 is threadedly engaged with the outer thread 121 of the protruding annular body 12 of the electrically conductive housing 1, thereby defining an internal space between the cover 2 and the electrically conductive housing 1. The internal space forms an airtight chamber 22 for receiving the battery device 3, the PCB 4 and the first electrically conductive resilient member 5.

The battery device 3 is installed at the top surface of the loading portion 111 of the electrically conductive housing 1. The PCB 4 is assembled to the top surface of the protruding annular body 12 of the electrically conductive housing 1. The first electrically conductive resilient member 5 (such as a metal coil spring or a metal resilient plate) is disposed between the PCB 4 and the battery device 3. The resilience of the first electrically conductive resilient member 5 is not employed as a given value of tire pressure detection. The first electrically conduction resilient member is used to stabilize the battery device 3 and realizes a good electrical contact between the battery device 3 and the PCB 4.

Generally, a tire has a negative electric charge due to the grounding of a rim. A casing (or housing) of a conventional tire pressure display device connecting to the tire valve stem is connected to the positive pole of a battery device and so has a positive electric charge. When the casing having a positive electric charge is inadvertently connected with the tire having a negative electric charge, a short circuit may be caused, which results in failure of a transmission device and so adversely affects the function of a pressure alarm.

As to an electrical connection of the battery device 3 of the tire pressure detector according to the present invention, the negative pole 31 of the battery device 3 is connected with the loading portion 111 of the electrically conductive housing 1 and then connected with a negative pole 41 of the PCB 4 through the protruding annular body 12 of the electrically conductive housing 1. The positive pole 32 of the battery device 3 is connected with a positive pole 42 of the PCB 4 through the first electrically conductive resilient member 5. Therefore, the casing (electrically conductive housing 1) connecting the tire 6 has a negative electric charge like the tire 6. Thus, the tire pressure detector according to the present invention can avoid short circuiting.

The PCB 4 has a pressure and temperature detecting device 43, which is electronic and includes a pressure and temperature sensor 431, a microprocessor 432 connecting with the sensor 431, and a transmitter 433 connecting with the microprocessor 432. The electronic pressure and temperature detecting device employs a conventional pressure and temperature sensor (pressure and temperature detecting IC) and conventional wireless transmission technology. The pressure and temperature sensor 431 s detects the pressure and temperature of the tire and generates data. The data are transmitted to the microprocessor 432 for processing. Then, the transmitter 433 transmits a signal.

To obtain a better pressure and temperature signal for the air in the tire, the pressure and temperature sensor 431 projects toward the air intake mouth 13. That is, in the first embodiment, the pressure and temperature sensor 431 extends from the PCB 4 toward the first electrically conductive resilient member 5 and so extends toward the air intake mouth 13.

In addition, an O-ring 23 is disposed between the protruding annular body 12 of the electrically conductive housing 1 and the sleeve portion 21 of the cover 2 for maintaining airtightness between the electrically conductive housing 1 and the cover 2.

Furthermore, an insulating object such as an insulating sleeve 33 is disposed between the periphery of the battery device 3 and the inner wall of the protruding annular body 12 of the electrically conductive housing 1 for isolating the battery device 3 from laterally contacting the electrically conductive housing 1.

In using the tire pressure detector according to the present invention, the air intake mouth 13 is mounted to the valve stem 61 of the tire 6. The valve nozzle device 133 opens the valve stem 61 whereby air inside the tire 6 flows into the airtight chamber 22 through the valve nozzle device 133 and the bottom and side surfaces of the battery device 3. The pressure and temperature sensor 431 disposed in the airtight chamber detects the pressure and temperature of the air inside the tire and transmits data to the microprocessor 432 for processing. The microprocessor 432 controls the transmitter 433 to transmit a signal. A receiver (not shown) disposed near a driver's seat receives and processes the signal and then displays the tire pressure and temperature value on a display. Thus, the driver can read and check the value of the tire pressure and temperature at any moment and so knows the status of the tire pressure and temperature. When the tire pressure or temperature is abnormal, the driver can handle it in real time.

Figure 4:
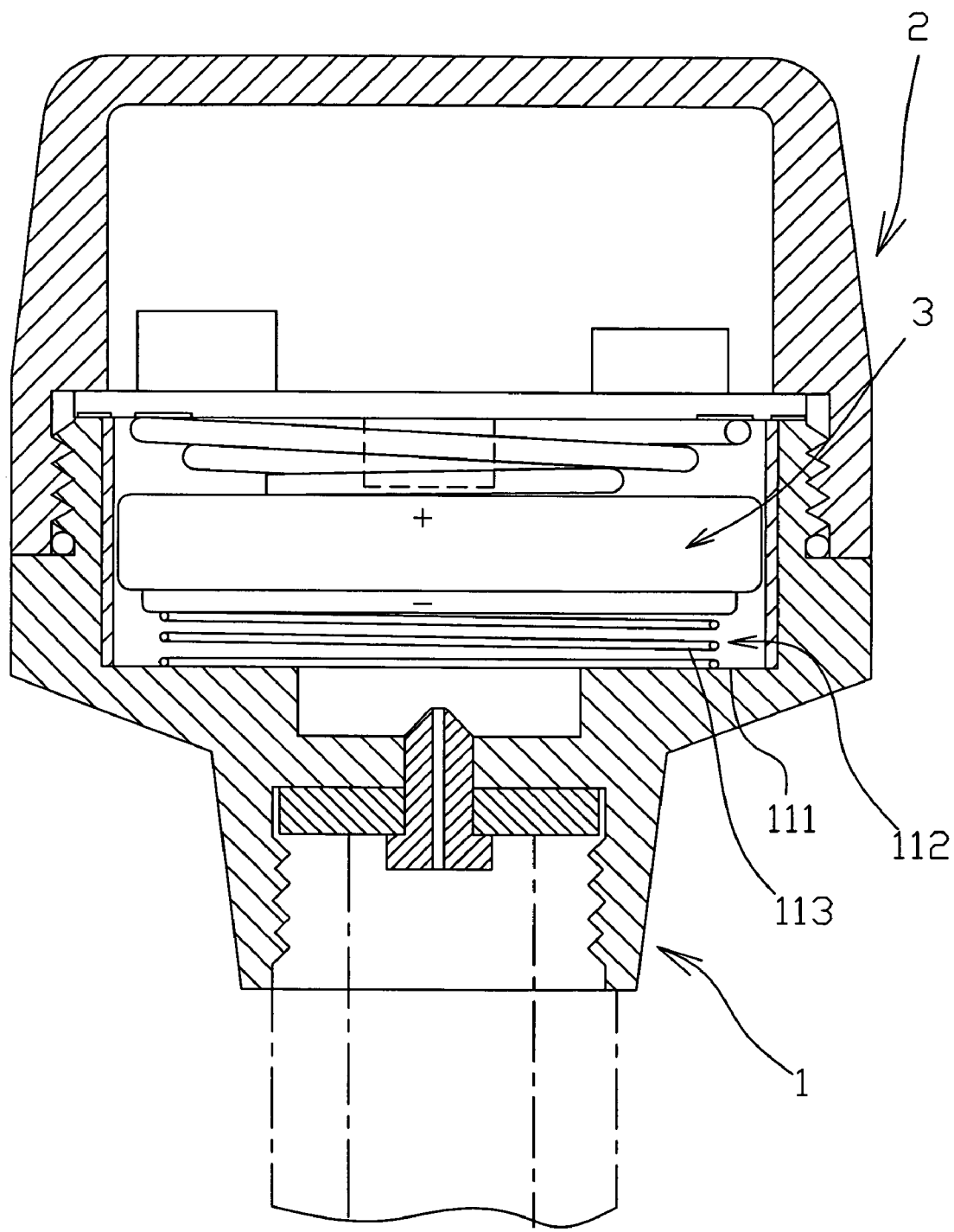
FIG. 4 is a schematic view showing a tire pressure detector in accordance with the first embodiment of the present invention, wherein an additional electrically conductive resilient member is disposed between a battery device and an electrically conductive housing.

For making the path through which the air in the tire flows into the airtight chamber 22 smoother, an electrically conductive spacer 112 is disposed between the battery device 3 and the loading portion 111 of the electrically conductive housing 1. For example, a second electrically conductive resilient member 113 (see FIG. 4) is disposed between the battery device 3 and the loading portion 111.

Figure 5:
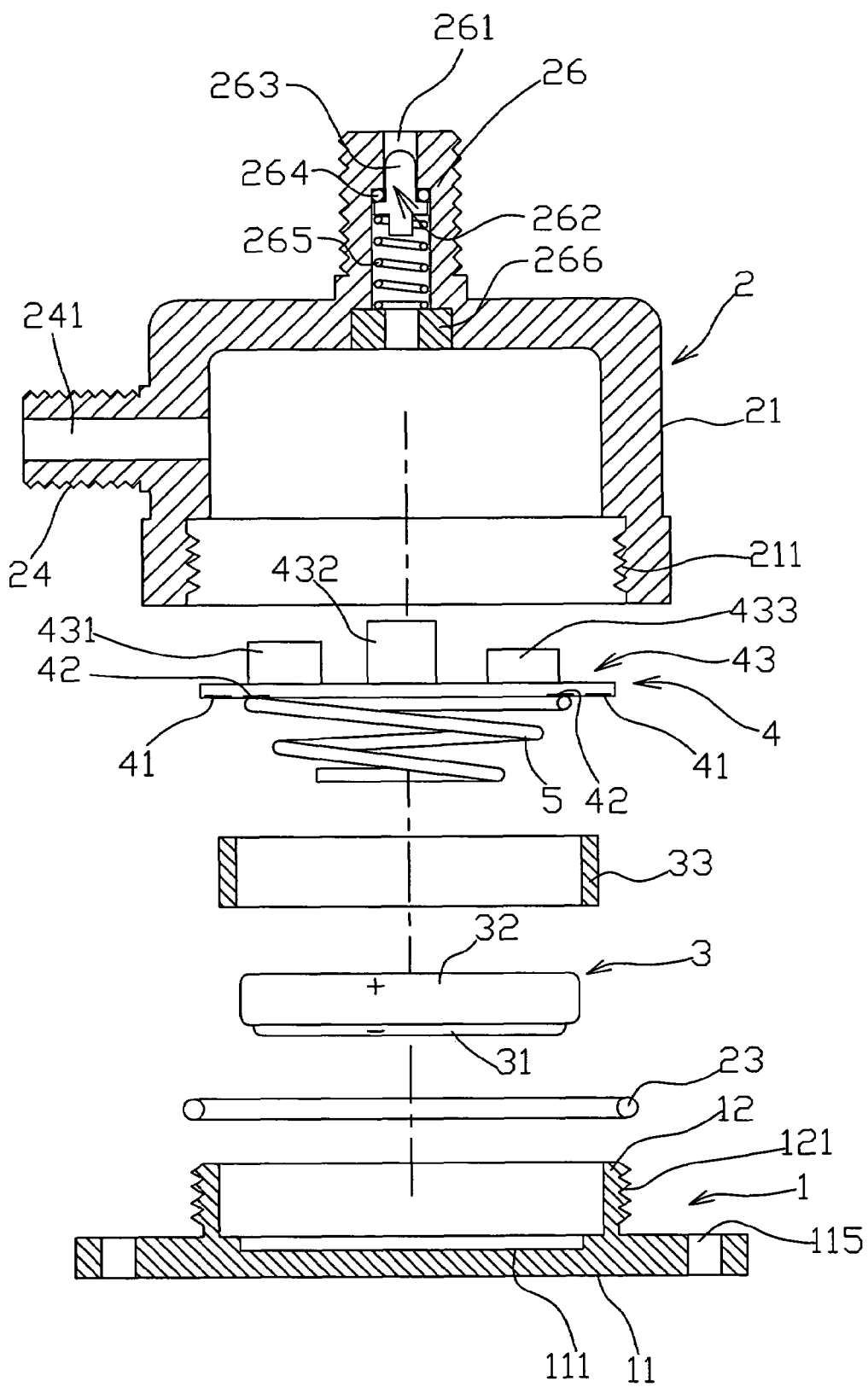
FIG. 5 is an exploded view of a tire pressure detector in accordance with a second embodiment of the present invention.
Figure 6:
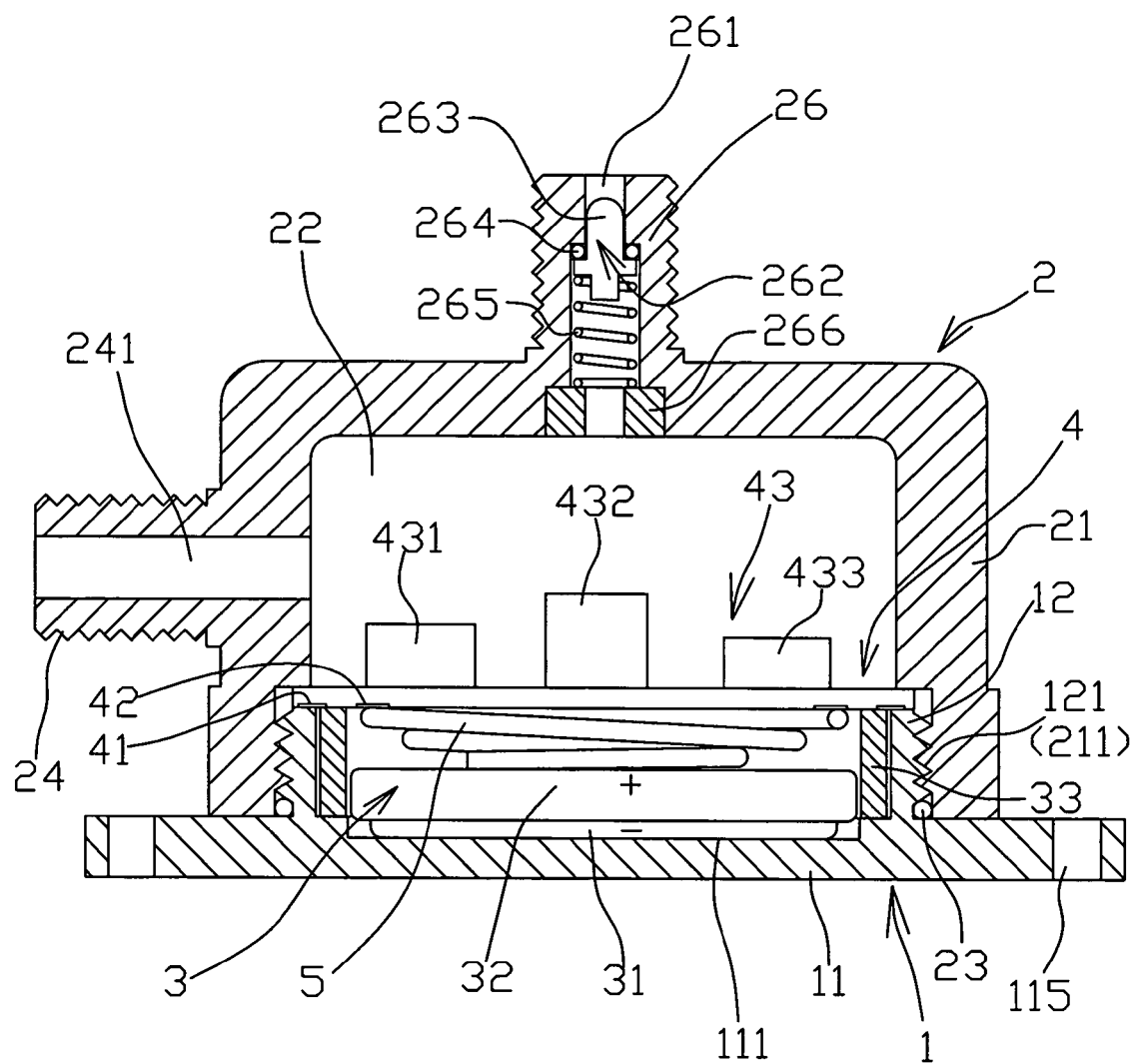
FIG. 6 is a cross-sectional view of an assembled tire pressure detector of FIG. 5.
Figure 7:
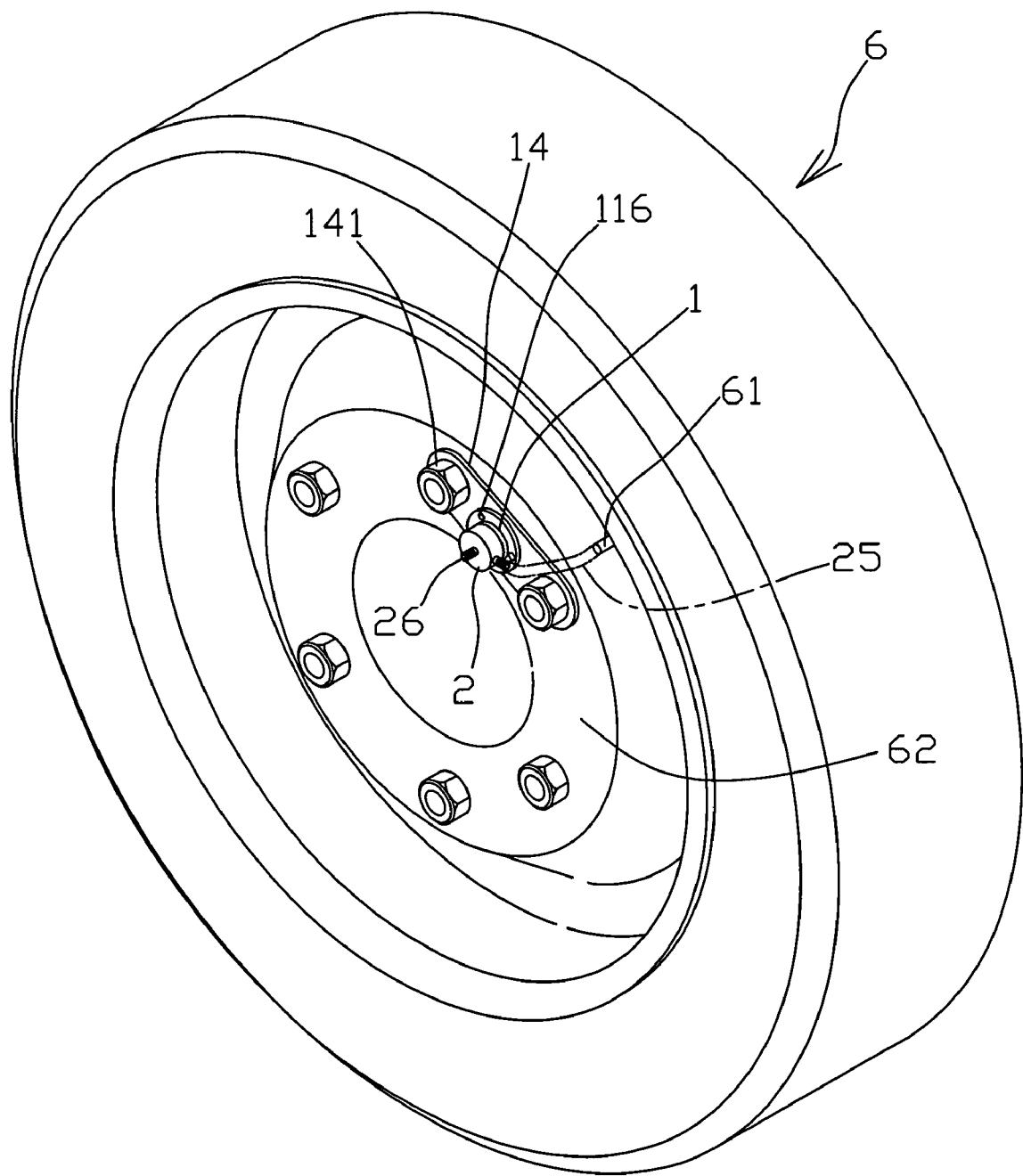
FIG. 7 is a schematic view showing the tire pressure detector of FIG. 6 being assembled to a tire valve stem.

Further referring to FIGS. 5~7, wherein FIG. 5 is an exploded view of a tire pressure detector in accordance with a second embodiment of the present invention, FIG. 6 is a cross-sectional view of an assembled tire pressure detector of FIG. 5, and FIG. 7 is a schematic view showing the tire pressure detector of FIG. 6 being assembled to a tire valve stem.

The tire pressure detector in accordance with the second embodiment has a generally similar structure and connection relationship to those of the first embodiment of the present invention. That is, the tire pressure detector of the second embodiment includes an electrically conductive housing 1, a cover 2, a battery device 3, a PCB 4 and a first electrically conductive resilient member 5.

The electrically conductive housing 1 has a housing body 11 and a protruding annular body 12. The protruding annular body 12 has an outer thread 121 at the outer surface thereof. A loading portion 111 is formed inside the housing body 11. The cover 2 has a sleeve portion 21 with an inner thread 211 being provided in the inner wall thereof. The inner thread 211 of the cover 2 is threadedly engaged with the outer thread 121 of the protruding annular body 12. An internal space defined by the cover 2 and the electrically conductive housing 1 forms an airtight chamber 22 for receiving the battery device 3, the PCB 4 and the first electrically conductive resilient member 5. The battery device 3 is installed at the top surface of the loading portion 111 of the electrically conductive housing 1. The PCB 4 is assembled to the top surface of the protruding annular body 12 of the electrically conductive housing 1. The first electrically conductive resilient member 5 is disposed between the PCB 4 and the battery device 3. Negative and positive poles 31, 32 of the battery device 3 are respectively connected with negative and positive poles 41, 42 of the PCB 4 through the electrically conductive housing 1 and the first electrically conductive resilient member 5. The PCB 4 has a pressure and temperature detecting device 43, which is electronic and includes a pressure and temperature sensor 431, a microprocessor 432, and a transmitter 433. The pressure and temperature sensor 431 detects pressure and temperature of the tire and generates data. The data is transmitted to the microprocessor 432 for processing. Then, the transmitter 433 transmits a signal. A receiver disposed near the driver's seat can receive the signal and display the tire pressure and temperature values in real time. The tire pressure detector of the second embodiment is also provided with an O-ring 23 between the protruding annular body 12 of the electrically conductive housing 1 and the sleeve portion 21 of the cover 2. An insulating object such as an insulating sleeve 33 is disposed between the periphery of the battery device 3 and the inner wall of the protruding annular body 12 of the electrically conductive housing 1.

However, the tire pressure detector of the second embodiment is provided with an air intake mouth 24 in the cover 2. A through-hole 241 is defined in the air intake mouth 24 and is in communication with the airtight chamber 22. The air intake mouth 24 is connected with a tire valve stem at one end of a guiding air tube 25. The guiding air tube 25 has a valve (not shown) at the other end which can open the tire valve stem 61. Thus, air inside the tire is guided into the airtight chamber 22 through the guiding air tube 25 and the air intake mouth 24. The pressure and temperature sensor extends from the PCB 4 toward the cover 2. Furthermore, the cover 2 is provided with an air inflation nozzle 26 which has a channel 261 therein. The channel 261 is in communication with the airtight chamber 22 and has a check valve assembly 262. The check valve assembly 262 includes a valve body 263, an O-ring 264, a resilient member 265 and a stopper tube 266 which are received in the channel 261 in sequence for providing the valve body with a check function from inside to outside. The tire pressure detector in accordance with the second embodiment is primarily distinguished from the first embodiment that in the second embodiment, when the tire pressure is insufficient, the tire may be inflated through the air inflation nozzle 26 without needing to detach the tire pressure detector. Similarly, when the tire pressure is too high, the tire pressure detector does not need to be detached, and the air in the tire may be deflated through pushing down the valve body 263 of the check valve.

For facilitating operation of air inflation, the tire pressure detector is disposed separately from the valve stem 61 of the tire 6 through the guiding air tube 25. In practice, the housing body 11 of the electrically conductive housing 1 is fixed at the rim 62 of the tire 6. The housing body has at least one fixing hole 115. A fixing member 116 fixes the housing body 11 at a fixing plate 14 through the fixing hole 115. A screw 141 fixes the fixing plate 14 at the rim 62 of the tire 6, thereby securely fixing the tire pressure detector at the rim 62 of the tire.

Figure 8:
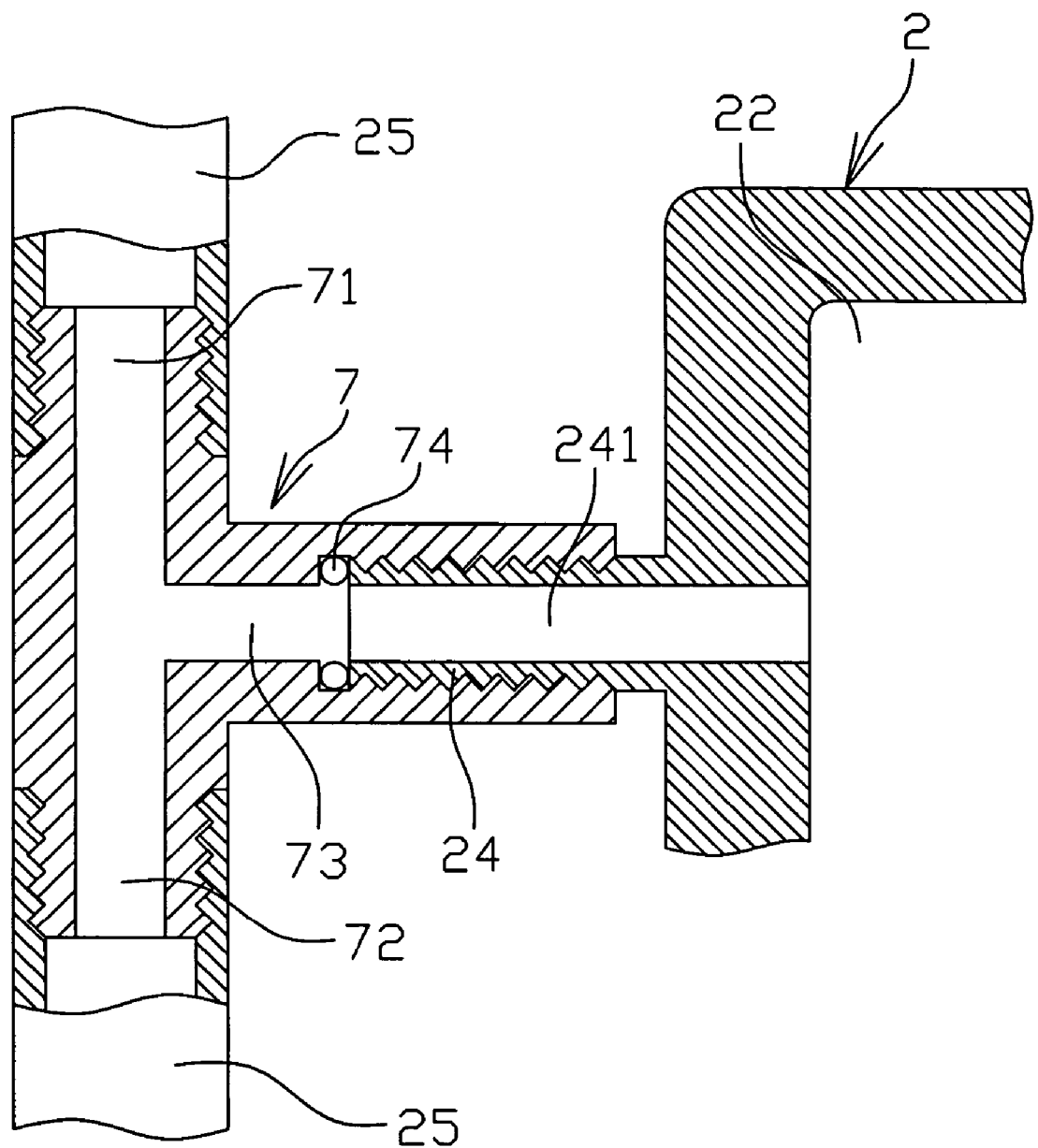
FIG. 8 is a cross-sectional view showing a tire pressure detector in accordance with a third embodiment of the present invention.

FIG. 8 is a cross-sectional view showing a tire pressure detector in accordance with a third embodiment of the present invention. The tire pressure detector of the third embodiment is based on the structure of the second embodiment. A three-way adapter 7 is disposed in the air intake mouth 24. The three-way adapter 7 includes a first air intake entrance 71, a second air intake entrance 72 and a switch entrance 73 which are in communication with one another. The switch entrance 73 is threadedly engaged with the air intake mouth 24. An O-ring 74 is disposed between the switch entrance 73 and the air intake mouth 24. The first and second air intake entrances 71, 72 respectively connect valve stems of a first and second tires (not shown) disposed at the same shaft and parallelly arranged at the same side each through a guiding air tube 25. Each guiding air tube 25 has a two way check valve assembly (not shown) at one end for opening the valve stem of the tire. Thus, air in the first and second tires flows into the airtight chamber 22 through the guiding air tubes 25 and the air intake mouths 24, simultaneously detecting pressure and temperature of the first and second tires.

The preferred embodiments, aspects, and features of the invention have been described in detail. It will be apparent to those skilled in the art that numerous variations, modifications, and substitutions may be made without departing from the spirit of the invention as disclosed and further claimed below.

What is claimed is:

1. A tire pressure monitor for mounting on the stem of a tire, comprising:
    a one-piece electrically conductive housing body with a protruding annular body, the protruding annular body having an outer thread at the outer wall thereof, the housing body having a loading portion formed therein and an air intake mouth, the air intake mouth having a lateral separating seat therein, the lateral separating seat being defined with a central hole, a valve nozzle device having an center throughhole and extending upwardly through said central hole of said separating seat, the air intake mouth being for mounting to a tire valve stem;
    a cover having a sleeve portion, the sleeve portion having an inner thread in the inner wall thereof for threadedly engaging with the outer thread of the protruding annular body, an internal space enveloped by the cover and the electrically conductive housing forming an airtight chamber for receiving the following parts:
    a battery device disposed at the top surface of the loading portion of the electrically conductive housing, the battery device including a positive pole and a negative pole, and the negative pole of the battery device being in contact with the loading portion whereby the housing body has a negative polarity;
    an insulating sleeve disposed between a periphery of the battery device and an inner wall of the housing body;
    a PCB disposed at the top surface of the protruding annular body of the electrically conductive housing, the PCB including a positive pole and a negative pole, the negative pole of the PCB contacting with the protruding annular body and then connecting with the negative pole of the battery device through the loading portion and the protruding annular body of the electrically conductive housing, and, the PCB having a pressure and temperature detecting device, a microprocessor, a transmitter; and
    a first electrically conductive resilient member disposed between the PCB and the battery device, and the positive pole of the battery device connecting with the positive pole of the PCB through the first electrically conductive resilient member.

2. The tire pressure monitor of claim 1, wherein the valve nozzle device includes a valve nozzle and a resilient gasket covering the periphery of the valve nozzle, the top portion of the valve nozzle projecting in the central hole of the lateral separating seat.

3. The tire pressure monitor of claim 1, wherein the pressure and temperature detecting device includes a pressure and temperature sensor, a microprocessor connected to the pressure and temperature sensor, and a transmitter connected to the microprocessor.

4. The tire pressure monitor of claim 3, wherein the first electrically conductive resilient member is a metal coil spring, and the pressure and temperature sensor projects from the PCB to the first electrically conductive resilient member.

5. The tire pressure monitor of claim 1, wherein an insulating object is disposed between the periphery of the battery device and the inner wall of the protruding annular body.

6. The tire pressure monitor of claim 5, wherein the insulating object includes an insulating sleeve.

7. The tire pressure monitor of claim 1, wherein an electrically conductive spacer is disposed between the loading portion and the battery device.

8. The tire pressure monitor of claim 7, wherein the spacer includes a second electrically conductive resilient member.

9. A tire pressure monitor for detecting tire pressure, comprising:
    a one-piece electrically conductive housing body with a protruding annular body, the protruding annular body having an outer thread at the outer wall thereof, the housing body having a loading portion formed therein;
    a cover having a sleeve portion, the sleeve portion having an inner thread in the inner wall thereof for threadedly engaging with the outer thread of the protruding annular body, an internal space enveloped by the cover and the electrically conductive housing forming an airtight chamber, the cover having an air intake mouth, the air intake mouth having a through hole in communication with the airtight chamber, the air intake mouth being connected with a tire valve stem through a guiding air tube, the airtight chamber receiving the following parts:
    a battery device disposed at the top surface of the loading portion of the electrically conductive housing, the battery device including a positive pole and a negative pole, and the negative pole of the battery device being in contact with the loading portion;
    a PCB disposed at the top surface of the protruding annular body of the electrically conductive housing, the PCB having a pressure and temperature detecting device, a microprocessor, a transmitter, and the PCB including a positive pole and a negative pole, the negative pole of the PCB contacting with the protruding annular body and then connecting with the negative pole of the battery device through the loading portion and the protruding annular body of the electrically conductive housing; and a first electrically conductive resilient member disposed between the PCB and the battery device, with the positive pole of the battery device connecting with the positive pole of the PCB through the first electrically conductive resilient member.

10. The tire pressure monitor of claim 9, wherein the pressure and temperature detecting device includes a pressure and temperature sensor, a microprocessor connected to the pressure and temperature sensor, and a transmitter connected to the microprocessor.

11. The tire pressure monitor of claim 10, wherein the pressure and temperature sensor projects from the PCB to the cover.

12. The tire pressure monitor of claim 9, wherein an insulating object is disposed between the periphery of the battery device and the inner wall of the protruding annular body.

13. The tire pressure monitor of claim 12, wherein the insulating object includes an insulating sleeve.

14. The tire pressure monitor of claim 9, wherein the housing body of the electrically conductive housing is fixed at a rim of a tire.

15. The tire pressure monitor of claim 14, wherein the housing body is provided with at least one fixing hole, a fixing member fixes the housing body at a fixing plate through the fixing hole, and the fixing plate is fixed at the rim of the tire through a screw.

16. The tire pressure monitor of claim 9, wherein the cover is provided with an air inflation nozzle which has a channel in communication with the airtight chamber, and the channel has a check valve assembly.

17. The tire pressure monitor of claim 16, wherein the check valve assembly includes a valve body, an O-ring, a resilient member and a stopper tube which are received in the channel in sequence.

18. The tire pressure monitor of claim 9, wherein a three-way adapter is disposed in the air intake mouth, and the three-way adapter includes a first air intake entrance, a second air intake entrance and a switch entrance which are in communication with one another, and the switch entrance is threadedly engaged with the air intake mouth, an O-ring is disposed between the switch entrance and the air intake mouth, the first and second air intake entrances respectively connect valve stems of parallelly arranged first and second tires each through a guiding air tube.

* * * * *